United States Patent
Belli et al.

(10) Patent No.: US 6,664,476 B2
(45) Date of Patent: Dec. 16, 2003

(54) ELECTRICAL CABLE WITH SELF-REPAIRING PROTECTION

(75) Inventors: Sergio Belli, Livorno (IT); Luigi Caimi, Lomagna (IT); Claudio Bosisio, Brembate (IT); Alberto Bareggi, Milan (IT); Luca Balconi, Bresso (IT); Giovanni Pozzati, Olgiate Olona (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/971,766

(22) Filed: Oct. 9, 2001

(65) Prior Publication Data

US 2002/0104678 A1 Aug. 8, 2002

Related U.S. Application Data

(63) Continuation of application No. 09/261,505, filed on Mar. 3, 1999, now abandoned.
(60) Provisional application No. 60/076,752, filed on Mar. 4, 1998.

(30) Foreign Application Priority Data

Mar. 4, 1998 (EP) .............................................. 98103767

(51) Int. Cl.[7] .............................. H01B 7/00; H01B 7/34
(52) U.S. Cl. .................................... 174/120 R; 174/36
(58) Field of Search ........................ 174/113 R, 120 R, 174/120 SC, 121 SR, 110 R, 116, 115, 36

(56) References Cited

U.S. PATENT DOCUMENTS

| | | |
|---|---|---|
| 2,345,864 A | 4/1944 | Arnold |
| 3,595,997 A | 7/1971 | Krasin |
| 3,775,548 A | 11/1973 | Zinser, Jr. et al. |
| 3,823,255 A | 7/1974 | La Gase et al. |
| 3,843,568 A | 10/1974 | Woodland et al. |
| 4,095,404 A | 6/1978 | Babayan |

(List continued on next page.)

FOREIGN PATENT DOCUMENTS

| | | |
|---|---|---|
| DE | 1415474 | 1/1969 |
| DE | 1590958 | 5/1970 |
| EP | 0288869 | 11/1988 |
| EP | 0940819 | 9/1999 |
| FR | 2085225 | 12/1971 |
| GB | 1364200 | 8/1974 |
| GB | 2032678 | 5/1980 |
| WO | WO 98/52197 | 11/1998 |

OTHER PUBLICATIONS

*Self–Sealing Direct–Buried 600 Volt Secondary Cable*, IEEE Transactions on Power Delivery, vol. 4, No. 1, Jan. 1989, pp. 45–49, J.H. Lawson & A. Kong.

Primary Examiner—William H. Mayo, III
(74) Attorney, Agent, or Firm—Finnegan, Henderson, Farabow, Garrett & Dunner, L.L.P.

(57) ABSTRACT

A cable for electric power transmission, electric power distribution or telecommunications, having an inner layer including a self-repairing material. The self-repairing material has properties including a predetermined cohesiveness and a controlled flowability. In the event of a discontinuity in at least one of the cable coating layers, these properties assist in reestablishing the continuity of the cable coating layers.

68 Claims, 4 Drawing Sheets

U.S. PATENT DOCUMENTS

| | | | |
|---|---|---|---|
| 4,145,567 A | * | 3/1979 | Bahder et al. ............... 174/107 |
| 4,414,355 A | | 11/1983 | Pokorny |
| 4,623,755 A | | 11/1986 | Henkel et al. |
| 4,631,229 A | | 12/1986 | Martens et al. |
| 4,703,132 A | | 10/1987 | Marciano-Agostinelli et al. |
| 4,785,163 A | | 11/1988 | Sandberg |
| 5,010,209 A | | 4/1991 | Marciano-Agostinelli et al. |
| 5,049,593 A | | 9/1991 | Marciano-Agostinelli et al. |
| 5,218,011 A | | 6/1993 | Freeman |
| 5,221,781 A | | 6/1993 | Aida et al. |
| 5,306,867 A | | 4/1994 | Connole et al. |
| 5,313,020 A | | 5/1994 | Sackett |
| 5,455,881 A | | 10/1995 | Bosisio et al. |
| 5,461,195 A | | 10/1995 | Freeman et al. |
| 5,817,974 A | | 10/1998 | Bovenschen et al. |
| 5,872,183 A | | 2/1999 | Bonnet et al. |
| 5,898,044 A | | 4/1999 | Nooren |
| 5,990,419 A | | 11/1999 | Bogese, II |
| 6,184,473 B1 | * | 2/2001 | Reece et al. ............ 174/110 R |
| 6,359,231 B2 | * | 3/2002 | Reece et al. ............ 174/110 R |
| 6,455,769 B1 | * | 9/2002 | Belli et al. ................ 174/23 C |
| 6,573,456 B2 | * | 6/2003 | Spruell et al. .......... 174/110 R |
| 2002/0108773 A1 | * | 8/2002 | Ware et al. ............. 174/120 R |

* cited by examiner

ELECTRICAL CABLE WITH SELF-REPAIRING PROTECTION

CROSS-REFERENCE TO RELATED APPLICATIONS

This application is a continuation of U.S. patent application Ser. No. 09/261,505, filed Mar. 3, 1999, now abandoned, the contents of which are relied upon and incorporated herein by reference; additionally, Applicants claim the right of priority under 35 U.S.C. §119(a)–(d) based on patent application No. 98103767.4, filed Mar. 4, 1998, in the European Patent Office; further, Applicants claim the benefit under 35 U.S.C. §119(e) based on prior-filed, copending provisional application No. 60/076,752, filed Mar. 4, 1998, in the U.S. Patent and Trademark Office.

BACKGROUND OF THE INVENTION

The present invention relates to a cable, in particular a cable for electric power transmission or distribution or for telecommunications. More particularly, the present invention relates to a cable as defined above comprising at least one coating layer and having self-repairing protection which is capable of restoring the continuity of the coating layer after it has been broken.

Electrical cables, in particular low- or medium-voltage cables for the distribution of electric energy for domestic or industrial use, generally consist of one or more conductors individually insulated by a polymeric material and coated with a protective sheath, which is also made of a polymeric material. These cables, particularly when installed underground, in tunnels or inside buried pipes, are subject to damage on these layers caused by various types of mechanical abuses, for example accidental impact with sharp tools such as shovels or picks, which exert on the cable both cutting and compression action. This can lead to partial or total rupture of the outer sheath and possibly also of the insulating layer, with consequent infiltration of moisture and generation of leakage currents. If the rupture of the coating layers reaches the conductor, the combined effect of leakage currents and moisture leads to a gradual corrosion of the conductor until, at the utmost, to a complete breakage of the conductor itself.

To obtain effective protection against such mechanical abuses, the cable can be provided with an outer structure capable of withstanding both cutting and compression, this outer structure consisting, for example, of a sheath made of a metal or of a plastic material combined with metal armouring. Besides being expensive, this solution leads to a considerable increase in cable dimensions and rigidity, thus making this solution unsuitable for cables which require easiness of installation and low costs, such as, in particular, in the case of low-voltage cables.

In patent application DE-1,590,958 a telecommunications or high-current cable is described which is protected from mechanical damage by means of an outer sheath having, on its inside, microcapsules containing a liquid which is capable of solidifying rapidly once the microcapsule has been broken. To this purpose, it is mentioned as preferred the use of the two components commonly used for manufacturing expanded polyurethane, these components being microencapsulated separately so that they react together at the moment the microcapsules are broken, forming an expanded material which closes the accidental cut. Alternatively, it is possible to use liquids which solidify when placed in contact with external agents, for example with moisture.

According to the Applicant, the solution proposed in the above-mentioned patent application is difficult to implement in practice and has many drawbacks. Firstly, it is to be observed that the possibility of self-repairing is limited to the outer sheath, and no indications regarding the possibility of restoring integrity of the insulating layer are provided. Moreover, to obtain an effective self-repairing effect, it is necessary to introduce a large amount of microencapsulated material during sheath extrusion, and this operation can result to be extremely difficult, besides being expensive. Lastly, it is to be pointed out that the mechanism of action of the microcapsules is irreversible, consequently the self-repairing effect can be carried out only once, namely at the moment the microcapsules are broken. Actually, during the various stages of the cable life (manufacturing, storage, installation, use), the coating layers are inevitably subjected to external mechanical actions of compression and bending and to thermal cycles of expansion and compression, which can lead to rupture of the microcapsules with consequent expansion and/or solidification of the material contained therein. Therefore, this material will no longer be able to effect the desired self-repairing action when the sheath should actually be damaged. It is also to be noted that, even when microcapsules are used containing a liquid material which solidifies on contact with moisture, accidental rupture of the microcapsules without any actual damage to the outer sheath nonetheless leads to solidification of the material because residual moisture is always present inside the cable.

SUMMARY OF THE INVENTION

The Applicant has now found that, in consequence of a mechanical damage which creates a discontinuity in at least one of the cable coating layers, it is possible to obtain effective self-repairing of the coating by virtue of the presence of an inner layer, placed, for example, between the insulating layer and the outer sheath. This inner layer comprises a material having a predetermined cohesiveness and, at the same time, a controlled flowability, which is capable of repairing the damage by restoring the continuity of the coating layer. After creation of a discontinuity in the coating, the material "moves" towards the point of damage and fills up, at least partly, the discontinuity by forming a substantially continuous layer which is capable of maintaining the functionality of the cable under the expected working conditions. The action of the self-repairing material, which occurs with a reversible mechanism, prevents, among other things, moisture infiltration and establishment of leakage currents, and thus a quick corrosion of the conductor.

The flowability of the material is predetermined so as to have sufficient fluidity at the working temperature of the cable, and at the same time so as to prevent the material from draining from the cable extremities or leaking in an uncontrolled manner from the coating rupture point.

In a first aspect, the present invention thus relates to a cable comprising a conductor and at least one coating layer, characterized in that the said cable comprises an inner layer comprising a self-repairing material having a predetermined cohesiveness and a controlled flowability.

According to a preferred aspect, the cable according to the present invention comprises an insulating coating layer and an outer sheath, and is characterized in that the inner layer is placed between the insulating layer and the outer sheath.

According to another embodiment of the present invention, the inner layer is placed between the conductor and the insulating layer.

According to a further embodiment, the cable according to the present invention comprises at least two insulating coating layers and is characterized in that the inner layer is placed between two of the said insulating layers.

According to a further aspect, the present invention relates to a method for imparting to a cable comprising a conductor and at least one coating layer a capacity of self-repairing the coating layer, characterized in that the said method comprises providing the cable with an inner layer comprising a material having the capacity, upon creation of a discontinuity in the coating layer, of re-establishing the continuity in the coating layer in a reversible manner.

DETAILED DESCRIPTION OF THE PREFERRED EMBODIMENTS

Figure 1:
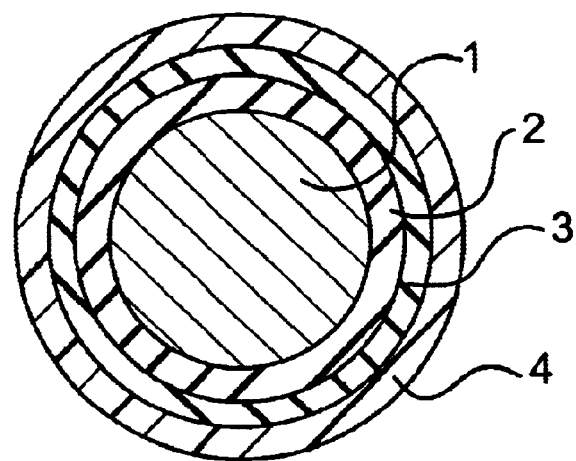
FIG. 1 shows schematically the cross-section of an electrical cable according to the present invention, of unipolar type, comprising, from the inside outwards, a conductor (1), an insulating layer (2), a self-repairing layer (3) as described above, and an outer protective sheath (4).
Figure 1A:
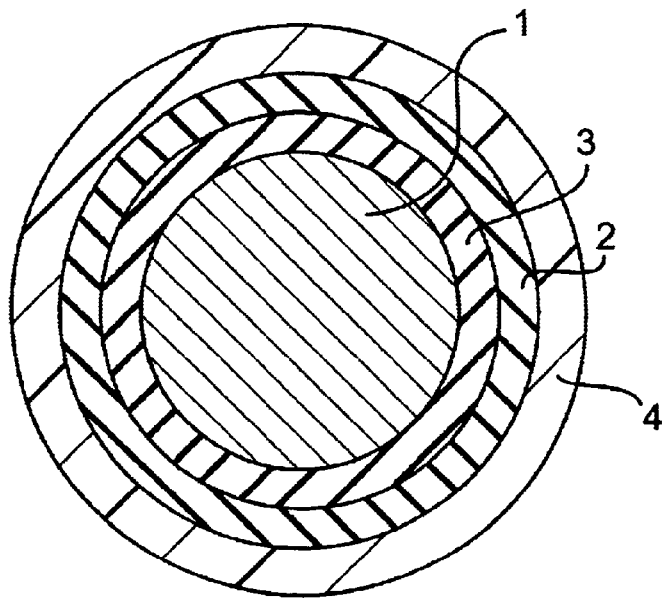
FIG. 1A shows schematically the cross-section of an electrical cable according to the present invention, of unipolar type, comprising, from the inside outwards, a conductor (1), a self-repairing layer (3), an insulating layer (2), and an outer protective sheath (4).
Figure 2A:
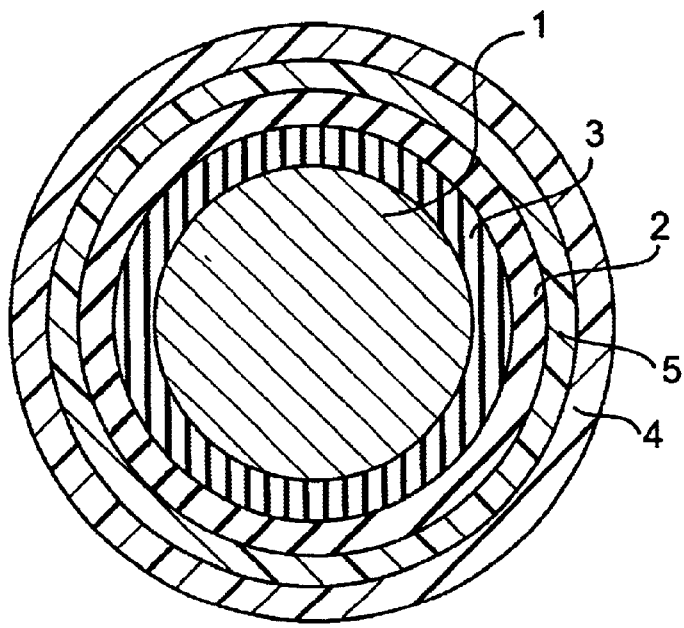
FIG. 2A shows a further embodiment of a unipolar electrical cable according to the present invention, comprising, in addition to the elements reported above for FIG. 1A, an expanded polymer layer (5) as described above, placed between the insulating layer (2) and the outer protective sheath (4), this layer giving the cable high impact strength.
Figure 2:
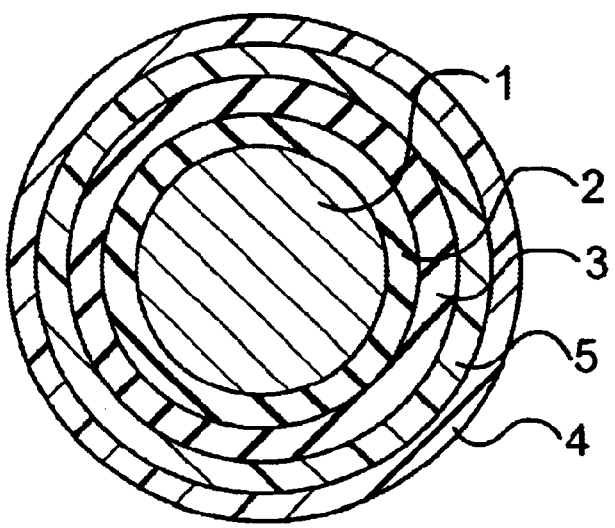
FIG. 2 shows a further embodiment of a unipolar electrical cable according to the present invention, comprising, in addition to the elements reported above for FIG. 1, an expanded polymer layer (5) as described above, placed between the self-repairing layer (3) and the outer protective sheath (4), this layer giving the cable high impact strength.

In the description hereinbelow and in the claims, the material which constitutes the inner layer will be referred to, for simplicity, as the "self-repairing material".

The term "inner layer" is understood herein to refer to a layer placed in any position between the conductor and the outermost coating layer, for example between the conductor and the insulating layer or, preferably, between the insulating layer and the outer sheath. Alternatively, when at least two insulating layers are present, the self-repairing layer can be placed between two of the said insulating layers.

The expression "discontinuity in at least one of the coating layers" is understood herein to refer to a partial or complete rupture of that layer. In the case of partial rupture only part of the thickness of the coating layer has been damaged, whereas there is complete rupture when the layer has been cut throughout its thickness. Needless to say, a partial rupture may become complete over time, for example following tractional or flexural mechanical stresses or alternatively as a result of thermal cycles of expansion and contraction to which the cable is subjected during use.

The expression "re-establishing the continuity" is understood herein to mean refill, at least partially, a point of rupture which has been created in the cable coating, so as to maintain the functionality of the cable at least for a predetermined period of time, and preferably for the entire period of the life of the cable, at least under the normal conditions of use. In other words, the self-repairing material is capable of preventing or at least slowing down the degradation of the materials constituting the cable, and in particular of the conductor, due to the infiltration of external agents through the point of discontinuity.

The Applicant has noted that, for the purposes of the present invention, the desired self-repairing of the cable is obtained by using a material having a predetermined cohesiveness and a controlled flowability. Although high cohesiveness values are considered desirable for the purposes of self-repairing, it is clear that these high values may conflict with flowability. A person skilled in the art will be capable of selecting the most suitable material, in which the desired compromise between cohesion and fluidity is achieved as a function of the specific cable which it is desired to manufacture and, above all, as a function of the conditions of installation and use envisaged for this cable, in particular in terms of temperature and pressure.

In a preferred embodiment, the self-repairing material is a dielectric material which is capable of re-establishing the electrical insulation of the cable. This property is particularly important in the case where mechanical damage is such as to cause in the insulating layer a partial or complete rupture, i.e. up to reaching the conductor. In general, dielectric rigidity values, under alternating current, of greater than 15 kV/mm, preferably greater than 20 kV/mm, and resistivity values of greater than $10^{14}$ Ω·cm, preferably greater than $10^{16}$ Ω·cm, are sufficient.

As mentioned above, the self-repairing material has predetermined cohesiveness which is such that, following the creation of a discontinuity in this material, for example by the action of a cutting tool, and once the cause of the discontinuity has been removed, the molecules which constitute the self-repairing material are capable of spontaneously recreating intermolecular bonds that are sufficient to restore continuity of the material. This phenomenon is of a reversible kind, i.e. the self-repairing material is capable of effectively carrying out its function an indefinite number of times.

For the purposes of the present invention, the expression "cohesiveness of the self-repairing material" refers both to the actual cohesive force up to detachment (referred to hereinbelow more simply as "cohesive force"), i.e. the force per surface area unit required to cause within the mass of a sample of material a complete detachment of one part of the material from the remaining part, and to the force of re-cohesion (or of auto-adhesion), that is the force required to recreate a complete detachment within the material once two portions of this material have been placed in contact for a predetermined time and under predetermined pressure and temperature conditions. In other words, the cohesiveness of the self-repairing material must be assessed both as regards the strength of intermolecular forces which hold the material together thereby ensuring its integrity, and as regards its capacity to recreate these intermolecular bonds spontaneously once they have been broken by the intervention of an external force.

The cohesive force can be measured according to the method given in the examples hereinafter. It has been found that cohesive force values, measured at room temperature, of at least 0.05 kg/cm² ensure a sufficient cohesiveness of the self-repairing material, although values of between 0.1 and 4 kg/cm² are preferred, and even more preferably between 0.2 and 2 kg/cm².

The force of re-cohesion can be evaluated empirically by placing, one on top of the other, two disks of material of predetermined dimensions and leaving the two disks in contact for a predetermined time at room temperature. At the end of this period, the force required to separate the two disks is measured. The closer this force is to the intrinsic cohesive force value of the material as such, the more the material is capable of re-unifying spontaneously after damage, thus reforming a continuous material. In practice, the Applicant has found that in the self-repairing materials according to the present invention, the force of re-cohesion is preferably substantially identical to the cohesive force as defined above, and at least has a value not less than 80%, preferably not less than 90%, relative to the cohesive force measured on the material as such.

In the Applicant's perception, another property of the self-repairing material according to the present invention is its controlled flowability, i.e. the self-repairing material must be capable of "moving" so as to migrate towards the point of rupture of the coating in an amount which is sufficient to repair the damage.

On the other hand, as already mentioned above, the flowability of the self-repairing material must be controlled in such a way as to avoid loss of material either by drainage from the extremities of the cable or by leaking from the point of rupture of the coating. This control of the flowability must be ensured not only at ambient temperature but also at higher temperatures, for example at the maximum working temperature envisaged for the cable (usually 75–90° C.).

It might be thought that the flowability of the self-repairing material could be evaluated on the basis of viscosity measurements. Actually, for the purposes of the present invention, the Applicant believes that a viscosity measurement is not significant per se, besides being not easy to carry out, in particular for materials with semi-solid properties. The Applicant has therefore found that it is more convenient to evaluate empirically the flowability of the self-repairing material by means of a test in which the displacement of a predetermined amount of material placed on an inclined plane at a predetermined temperature and for a predetermined period is measured. This test is described in the technical specification ST/LAB/QFE/06, §5.5, established by France Telecom/CNET (published: January 1994). In particular, this evaluation can be carried out as follows. About 3 grams of self-repairing material are placed on a smooth aluminium plate inclined at 60° relative to the horizontal plane. The material constituting the plate is selected so as to ensure high adhesion of the test material to the plate itself, thereby preventing the material from sliding down the plate without undergoing a substantial deformation. The plate is placed in an oven thermostatically adjusted to 60° C.; after 24 hours the material is checked for any demixing of the various components present therein, and displacement of the material front down the inclined plane, relative to its initial position, is measured, for example by means of a gauge, checking that there has been essentially no sliding of the entire mass.

In practice, the Applicant has found that the desired control of the flowability is obtained when the self-repairing material, subjected to the flow test on an inclined plane at 60° C. for 24 hours described above, shows a displacement of the front of the material sample on the inclined plane of between 0.5 and 400 mm, preferably between 1 and 200 mm and even more preferably between 50 and 100 mm.

Moreover, the Applicant believes that the "movement" of the self-repairing material towards the point of rupture is promoted by the action of radial compression exerted on the self-repairing layer by the other layers constituting the cable, in particular by the outer sheath. Indeed, the specific volume of plastics decreases as the temperature decreases, thus during the cooling process following extrusion the outer sheath contracts to produce a radial compressing action on underlying layers, with an estimated pressure of the order of a few bar. In the case of rupture of the cable coating, this pressure forces the self-repairing material towards the point of rupture, thereby assisting the self-repairing. Moreover, the Applicant has observed that the leakage of self-repairing material from the point of rupture stops rapidly by virtue of the cohesive properties of this material.

Another advantageous property of the self-repairing material is its capacity to exert an effective blocking action against external moisture which tends to infiltrate the cable through the point of rupture of the coating. For this purpose, it is appropriate for the self-repairing material to have a low saturation water content, with values, measured at room temperature by Karl-Fisher titration, generally of less than 400 ppm, preferably less than 200 ppm.

Moreover, in the case where the self-repairing layer is placed outside the insulating layer and the latter consists of a material which is crosslinkable via silanes, it is convenient for the self-repairing material, although absorbing small amounts of moisture, to have a sufficient permeability to water vapour since, as is known, crosslinking via silanes takes place in the presence of water. Preferred values of permeability to water vapour, measured at room temperature according to ASTM E96, are generally between $1.2 \times 10^{-7}$ and $8.0 \times 10^{-6}$ g/(cm·hour·mmHg).

A further preferred characteristic of the self-repairing material is a substantial physico-chemical inertness with respect to the plastic materials with which it is placed in contact. The reason for this is that it is desirable that the self-repairing material does not interact, under the working conditions, with the materials which constitute adjacent layers (generally polyolefins such as polyethylene and ethylene copolymers, which may or may not be crosslinked), thereby avoiding swelling phenomena for these materials with a consequent worsening in their mechanical properties.

A first class of materials suitable for making the self-repairing layer according to the present invention consists of amorphous polymers having properties of high-viscosity liquids or of semi-solids, these polymers being selected, for example, from the following classes of products:

(a) polyisobutene or isobutene copolymers with minor amounts of different $C_4$–$C_{12}$ α-olefins;

(b) atactic propylene homopolymers;

(c) silicone rubbers, consisting of linear chains of monomer units of formula —O—$SiR_1R_2$—, in which $R_1$ and $R_2$ are optionally substituted aliphatic or aromatic radicals such as, for example: dimethylsilicone, methylphenylsilicone, methylvinylsilicone, silicones containing cyanoacrylic or fluoroalkyl groups, and the like.

Among the products mentioned above, it is particularly preferred to use polyisobutene having a viscosimetric (Staudinger) average molecular weight of between 2,000 and 50,000, preferably between 5,000 and 20,000, known commercially under the trademarks Vistanex® (Esso Chemical), Hycar® (Goodrich), Oppanol® (BASF), and the like.

The amorphous polymers mentioned above can be used as such or dissolved in a suitable solvent, for example a mineral oil or a synthetic oil, in particular a paraffin oil or a naphthenic oil such as, for example, the oils known by the abbreviations ASTM 103, 104A and 104B. Preferably, low molecular weight products that are homologues of the amorphous polymer can be used as solvents.

For example, in the case of polyisobutene, a polybutene oil with an osmometric average molecular weight of between 400 and 1,300, preferably between 500 and 1,000, which can be obtained by polymerization of $C_4$ olefin mixtures containing mainly isobutene, can advantageously be used as solvent. Products corresponding to these characteristics can be found on the market under the trademarks Napvis® (BP Chemicals) and Indopol® (Amoco).

In the case of silicone rubbers, it is possible to use a silicone oil with a viscosity generally between 100 and 5,000 mm²/sec at 25° C. as solvent.

In general, the amount of solvent is between 5 and 95% by weight, preferably between 50 and 90% by weight, relative to the total weight of the mixture.

In the case where the amorphous polymer is dissolved in a suitable solvent as mentioned above, a thickener can advantageously be added to the composition, the main function of this thickener being to control flowability, thereby reducing the risk of the self-repairing material uncontrollably leaking from the cable.

Inorganic products such as pyrogenic silica, bentonite and the like, or mixtures thereof, can for example be used as thickeners. The amount of thickener is generally between 1 and 20 parts by weight, preferably between 2 and 10 parts by weight, relative to the total weight of the mixture.

The self-repairing material as described above can be prepared according to standard techniques, for example by dissolving the amorphous polymer and any additives in the oily solvent by heating. If a thickener is used, it can be dispersed by vigorous stirring under heating.

Another category of materials which are suitable for forming the self-repairing inner layer according to the present invention consists of solid polymeric materials dispersed in an oily phase.

The oily phase can consist, for example, of:
(a) paraffinic oils or naphthenic oils, for example the oils ASTM 103, 104A or 104B;
(b) polybutene oils with an osmometric average molecular weight of between 400 and 1,300, preferably between 500 and 1,000, which can be obtained by polymerization of $C_4$ olefin mixtures containing mainly isobutene, for example the commercial products Napvis® (BP Chemicals) and Indopol® (Amoco);
(c) polypropylene oils;
(d) low molecular weight polyesters, for example acrylic acid polyesters, such as the product ECA 7955 from Exxon Chemical Co.;
or mixtures thereof.

The solid polymeric material is generally a high molecular weight polymer with elastomeric properties, selected, for example, from:
(i) styrene block copolymers or terpolymers with different olefins and/or with dienes, for example with butene, ethylene, propylene, isoprene, butadiene and the like, and in particular: styrene-butadiene-styrene (S-B-S), styrene-isoprene-styrene (S-I-S) and styrene-ethylene/butene-styrene (S-EB-S) triblock polymers; styrene-ethylene/propylene (S-EP) and styrene-ethylene/butene (S-EB) diblock polymers; styrene-butadiene or styrene-isoprene branched polymers; such products are commercially available, for example, under the trademark Kraton® (Shell Chemical);
(ii) polyisobutene or isobutene copolymers with minor amounts of different $C_4$–$C_{12}$ α-olefins, having a viscosimetric (Staudinger) average molecular weight generally of greater than 40,000, preferably between 50,000 and 200,000;
(iii) copolymers of propylene with ethylene and/or with $C_4$–$C_{12}$ α-olefins (for example 1-butene, isobutene, 1-hexene, and the like), or with $C_4$–$C_{20}$ dienes (for example 1,3-butadiene, 1,4-hexadiene, 5-ethylidene-2-norbornene, and the like), known commercially, for example, under the trademarks Dutral® (Enichem) or Nordel® (Dow-Du Pont);
(iv) polyisoprene or natural rubber;
(v) nitrile rubbers;
(vi) butyl rubbers;
(vii) amorphous ethylene copolymers, for example copolymers of ethylene with esters having ethylenic unsaturation, such as ethylene/vinyl acetate (EVA), ethylene/methyl acrylate (EMA), ethylene/ethyl acrylate (EEA), ethylene/butyl acrylate (EBA) copolymers, and the like;
or mixtures thereof.

The solid polymeric material can be dispersed in the oily base in a subdivided form, for example in the form of granules or powder, in amounts generally of between 5 and 70% by weight, preferably between 10 and 60% by weight, relative to the total weight of the mixture. A homogeneous dispersion can be obtained by suitable mixing according to the standard techniques, for example using an internal mixer of the type with tangential rotors (Banbury) or interlocking rotors, or alternatively in continuous mixers of the Ko-Kneader type (Buss) or co-rotating or counter-rotating twin-screw mixers.

To avoid an unacceptable reduction in the mobility of the self-repairing material at low temperatures, the optionally present oily products generally have a pour point, determined according to ASTM D97-57, of less than 0° C., preferably less than –10° C. and even more preferably less than –20° C.

Inorganic fillers of various types can be added to the self-repairing materials described above, these fillers having the function of improving processability and of controlling flowability, for example: kaolin, calcium carbonate, aluminium hydroxide, magnesium hydroxide, talc, precipitated silica, and the like, or mixtures thereof. The amount of inorganic fillers can vary within a wide range, generally between 5 and 50 parts by weight, preferably between 10 and 30 parts by weight, relative to the total weight of the mixture. The self-repairing material can also contain additives of various types, such as: stabilizers, antioxidants, anti-copper products, glass microspheres, and the like.

To give the anti-repair material greater cohesiveness, tackifying agents can optionally be added such as: natural or synthetic rosins (for example the products Polypale® from Hercules, or Escorez® from Esso Chemicals), or derivatives thereof; esterified polyalcohols (for example the products Oulupale® from Veitsiluotooy), or mixtures thereof. The amount of tackifying agent is generally between 1 and 20% by weight, preferably between 5 and 10% by weight, relative to the total weight of the mixture.

The thickness of the self-repairing material layer according to the present invention must be sufficient to ensure self-repairing of the cable, therefore this thickness is selected mainly as a function of the dimensions of the cable and of the type of damage which the latter might sustain. In general, thicknesses of not less than 0.1 mm, preferably between 0.2 and 2 mm and more preferably between 0.3 and 1 mm, are sufficient.

For the purpose of giving the electrical cable according to the present invention impact-strength properties, an expanded polymer coating can be added, as described in European patent application No. 97107969.4 filed on May 15, 1997 in the name of the Applicant. This coating is preferably placed in direct contact with the outer protective sheath. Although the expanded polymer coating per se does not have any particular resistance to cutting, it has the capacity of absorbing, at least partly, the energy transmitted by impact with a cutting tool and thus of reducing the risk of damage to the layers of cable coating.

The expanded polymer coating can consist of any type of expandible polymer such as, for example: polyolefins, olefinic copolymers, olefin/unsaturated ester copolymers, polyesters, polycarbonates, polysulphones, phenolic resins, ureic resins, and mixtures thereof. Preferably, olefinic polymers or copolymers, in particular based on polyethylene (PE) and/or polypropylene (PP), mixed with ethylene-propylene rubbers can be used. PP modified with ethylene-propylene rubbers (EPR), with a PP/EPR weight ratio of between 90/10 and 50/50, preferably between 85/15 and 60/40, can advantageously be used. It is also possible to mix prior to expansion the polymeric material with a predetermined amount of rubber in powder form, for example vulcanized natural rubber. In particular, the Applicant has found that a polymer material which has, prior to expansion, a flexural modulus at room temperature of greater than 200 MPa, preferably of at least 400 MPa (measured according to ASTM D790), but not greater than 2,000 MPa, so as not to excessively increase the rigidity of the finished product, is particularly suitable for this purpose. The degree of expansion of the polymer is extremely variable depending on the specific polymer used and on the thickness of the coating which it is intended to obtain. In general, the degree of expansion can range between 20% and 3,000%, preferably between 30% and 500%. The minimum thickness of the expanded layer which is capable of ensuring the desired impact strength depends mainly on the degree of expansion and on the flexural modulus of the polymer. In particular, for medium voltage cables an expanded-coating thickness of at least 0.5 mm, preferably of between 1 and 6 mm is sufficient. Further details regarding the characteristics of this expanded polymer layer are given in the above-mentioned European patent application No. 97107969.4, whose text constitutes an integral part of the present description.

For the purpose of promoting dispersion of the leakage microcurrents which may be present directly after the cable has been damaged and before it has been fully self-repaired, this conductor can advantageously be coated with a layer of polymeric material having semiconductive properties. By favouring dispersion of the leakage microcurrents, this material reduces the risk of triggering of corrosion points onto the conductor. The semiconductive layer, which is applied to the conductor by, for example, taping or, preferably, extrusion, generally has a thickness of at least 0.05 mm, preferably between 0.1 and 0.5 mm.

The conductor (1) generally consists of metal wires, preferably made of copper or aluminium, plaited together according to standard techniques.

The insulating layer (2) and the outer protective sheath (4) consist of a crosslinked or non-crosslinked polymer composition having as base component a polymer selected, for example, from: polyolefins (homopolymers or copolymers of various olefins), olefin/ethylenically unsaturated ester copolymers, polyesters, polyethers, polyether/polyester copolymers, and mixtures thereof. Examples of such polymers are: polyethylene (PE), in particular linear low density PE (LLDPE); polypropylene (PP); propylene/ethylene thermoplastic copolymers; ethylene-propylene rubbers (EPR) or ethylene-propylene-diene rubbers (EPDM); natural rubbers; butyl rubbers; ethylene/vinyl acetate (EVA) copolymers; ethylene/methyl acrylate (EMA) copolymers; ethylene/ethyl acrylate (EEA) copolymers; ethylene/butyl acrylate (EBA) copolymers; ethylene/$\alpha$-olefin thermoplastic copolymers, and the like.

The abovementioned polymers can be crosslinked according to known techniques, in particular by heating in the presence of a radical initiator, for example an organic peroxide such as dicumyl peroxide. Alternatively, crosslinking can be carried out using silanes, which involves the use of a polymer such as those mentioned above, in particular a polyolefin, to which silane units comprising at least one hydrolysable group, for example trialkoxysilane groups, in particular trimethoxysilane, have been covalently attached. The silane units can be introduced by radical reaction with silane compounds, for example methyltriethoxysilane, dimethyldiethoxysilane, vinyldimethoxysilane and the like. The crosslinking is carried out in the presence of water and a crosslinking catalyst, for example an organic titanate or a metal carboxylate. Dibutyltin dilaurate (DBTL) is particularly preferred.

The self-repairing layer can be produced by means of a process of pultrusion of the self-repairing material on the cable core, the latter consisting of the conductor alone or, preferably, of the conductor which has been pre-coated with at least one insulating layer according to known techniques. This pultrusion process involves depositing on the cable core a layer of self-repairing material which is maintained at a sufficient degree of fluidity, for example by heating, and then forming this layer so as to obtain the desired final thickness. Further coating layers (for example the outer protective sheath) can then be applied to the cable core thus coated, according to known techniques.

Therefore, in a further aspect, the present invention relates to a process for manufacturing a cable having a layer of self-repairing material, this process comprising the following steps:

(i) depositing the self-repairing material, maintained in a fluid state, on a cable core;

(ii) forming the said layer of self-repairing material so as to obtain a uniform layer of a predetermined thickness.

The pultrusion process can be carried out batchwise or, preferably, continuously.

Both steps of the pultrusion process can be carried out, for example, using an application head consisting, for example, of a hollow cylindrical element having an inlet hole whose diameter is slightly larger than that of the cable core, and an outlet hole having a predetermined diameter which depends on the desired thickness of the self-repairing layer. Once the initial section of the cable core has been introduced through the abovementioned holes, the head is fed with the self-repairing material which has been preheated so as to maintain the self-repairing material at a temperature such as to obtain a sufficient degree of fluidity. This temperature is generally between 50° and 200° C., and is selected essentially as a function of the nature of the self-repairing material. By running the cable core inside the application head, the first stage of deposition of the self-repairing material is carried out. The passing rate of the cable core through the application head, and thus the time of immersion in the self-repairing material, can vary within a wide range, generally between 1 and 1,000 m/min, and is selected mainly as a function of the type of self-repairing material used.

The subsequent forming step is carried out by the outlet hole of the application head, which has a diameter corresponding to the predetermined diameter value which it is desired to obtain for the warm cable core coated with the self-repairing material.

Alternatively, the cable bearing the self-repairing layer according to the present invention can be made using an extrusion head of conventional type. The self-repairing material is fed into the extrusion head under heating so as to obtain a sufficient fluidity, and is distributed inside the head by means of a suitable conveyor so as to obtain an outer corona on exit from the extrusion head, in which the material is uniformly distributed. The extrusion head can be of the single-layer type or of the multilayer type, so as to effect co-extrusion of the self-repairing layer and of one or more of the adjacent layers.

To describe the invention further, some working examples are given hereinbelow.

EXAMPLES 1–5

Various types of self-repairing materials according to the present invention were prepared, whose compositions are reported in Table 1 (as parts by weight).

As to Example 1, the commercial product was used as such, and the antioxidant was added thereto by dissolution under heating.

The materials of Examples 2–4 were prepared by dissolving under heating (120–150° C.) solid polymeric components and antioxidant in the oily phase. In the case of Example 2, pyrogenic silica was dispersed in the thus obtained solution under heating and with vigorous stirring.

As regards Example 5, the composition was prepared as follows. The solid polymeric components were processed in an open mixer with moderate heating until a continuous and homogeneous sheet was obtained. The polybutene oil and the antioxidant were then added, the stirring being continued until the mixture was fully homogeneous.

The following measurements were carried out on the self-repairing materials thus prepared.

(a) Cohesive Force.

Figure 3:
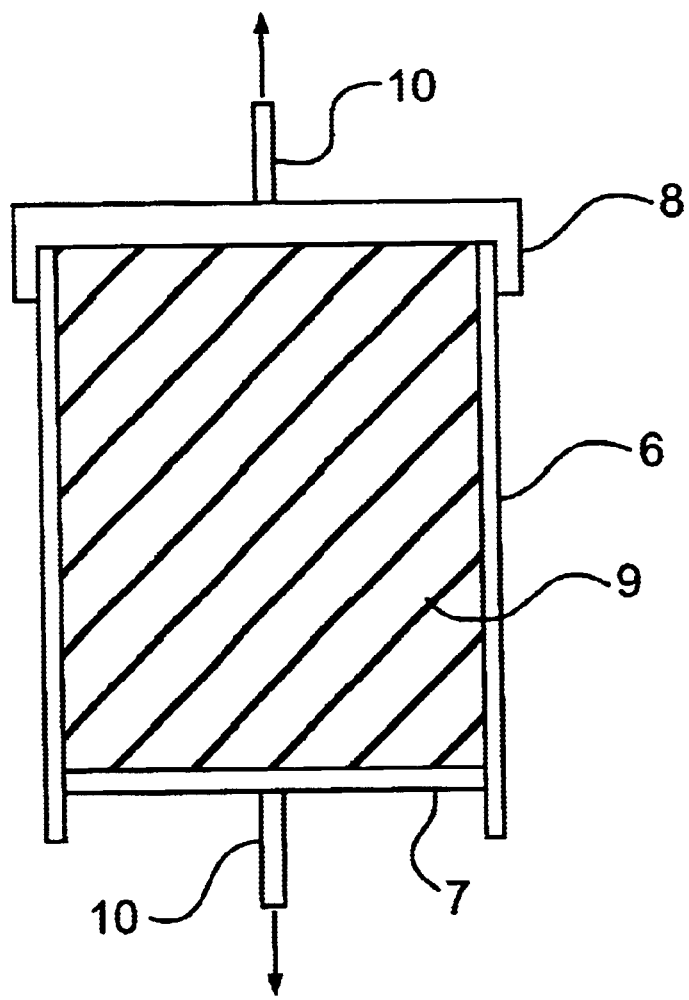
FIG. 3 shows schematically the cross-section of the device used to measure the cohesive force of the self-repairing material, a detailed description of which is given in the examples.

The cohesive force was determined by means of a device which is shown schematically (in cross-section) in FIG. 3. With reference to FIG. 3, a cylindrical aluminium container (6) (height 45 mm, inside diameter 44 mm, which corresponds to a cross-section of 15.2 cm$^2$), having a movable base (7), also made of aluminium, and a lid (8), was filled with the test material (9), preheated to about 150° C. so as to obtain sufficient fluidization and thus homogeneous distribution of the material inside the container, thereby avoiding the formation of air bubbles. Both the movable base (7) and the lid (8) have a locking rod (10) which allows a dynamometer (not shown in FIG. 3) to be attached thereto. The use of aluminium ensures a high level of adhesion to the test material, thereby avoiding any detachment of the material from the movable base and/or from the walls of the cylinder during the test.

After cooling of the material to room temperature, the cylinder is closed by the lid (8) (for example by screwing down by means of a suitable thread, not shown in FIG. 3) and is inserted into an Instron dynamometer, by means of which an increasing tensile force is applied to the movable base (7) (pulling rate: 2 mm/min) until the self-repairing material inside the mass "breaks" with detachment of some of the material, which adheres to the movable base, from the mass adhering to the walls of the cylinder. The cohesive force is given by the load "at break" (expressed in kg) per unit of surface area (in cm$^2$). For each material, the measurement was carried out on three samples. In Table 1 the arithmetic mean value is reported.

The re-cohesive capacity of the various test materials was evaluated in the following way. A layer of self-repairing material of about 1 cm in thickness was deposited on the surface of two metal disks (made of aluminium) having a 40 mm diameter. The deposition was carried out under heating and with the aid of a spatula with rounded edges, so as to obtain a layer which was as smooth and homogeneous as possible and free of air bubbles. On the opposite face, each disk was fitted with a locking rod to allow a dynamometer to be attached thereto. Once the material had cooled to room temperature, the two disks were placed one on top of the other with the two faces coated with the self-repairing material coming together, thus producing an overall thickness of material of about 2 cm. No compressive force was applied to the two disks, therefore the only force acting on the contact surface between the two layers of self-repairing material was the weight-force (equal to about 50 grams) exerted by the assembly of the upper disk and of the related layer of self-repairing material. After about 3 hours, the force required to separate the material into two distinct parts (without detaching the disks from this material) was measured using an Instron dynamometer. It was found that this force was substantially identical to the cohesive force measured using the cylinder with a movable base, as described above. In addition, once re-cohesion took place, it was no longer possible to identify the joining surface between the two layers.

(b) Displacement on an Inclined Plane.

A smooth aluminium plate (dimensions 400×80×2 mm) was cleaned thoroughly with alcohol and left to dry. 3 g of self-repairing material were placed on the upper part of the plate using a spatula with rounded edges. The material was shaped by means of the spatula so as to obtain a small uniform mass of rounded shape, while avoiding the formation of air bubbles. The material was then left to stand in a horizontal position for about two hours. The initial position was marked on the edge of the plate. The plate was then fixed to a support so as to form an angle of 60° relative to the horizontal plane, and placed in an oven thermostatically adjusted to 60° C. After 24 hours, the plate was removed from the oven and left to cool for one hour at room temperature. The displacement, relative to the initial position, of the front of the material along the inclined plane was measured using a gauge. The results are given in Table 1. No appreciable demixing of the components was observed for any of the test samples.

(c) Ageing of Crosslinked Polyethylene Specimens.

To evaluate inertness of self-repairing materials, prepared as above, with respect to the polyolefins which normally constitute the coating layers adjacent to the self-repairing layer, ageing tests were carried out on samples of silane-crosslinked polyethylene (Getilan® ATP 3) kept at 80° C. for 7 and 14 days in the materials of Examples 1 and 2. In particular, the weight variation relative to the initial weight and the mechanical properties before and after ageing were determined. The results are given in Table 2. As can be seen, the tests carried out show the substantial inertness of the self-repairing materials relative to crosslinked polyethylene, as demonstrated by the extremely narrow variations in weight and in mechanical properties of the test samples.

TABLE 1

| Example | 1 | 2 | 3 | 4 | 5 |
|---|---|---|---|---|---|
| Vistanex ® LMMH | 100 | 30 | — | — | — |
| Vistanex ® MML80 | — | — | — | — | 15 |
| Napvis ® DE10 | — | 70 | 88 | 86 | 100 |
| Silica CAB-O-SIL H5 | — | 5 | — | — | — |
| Kraton ® G 1702 | — | — | 12 | 14 | — |
| Dutral ® CO 043 | — | — | — | — | 85 |
| Irganox ® 1010 | 0.5 | 0.5 | 0.5 | 0.5 | 0.5 |
| Cohesive force (kg/cm$^2$) | 0.38 | 0.70 | 0.13 | 0.38 | 1.00 |
| Displacement on inclined plate (mm) | 350 | 1 | 10 | 1 | 75 |

Vistanex ® LMMH (Esso Chem. Co.): polyisobutene with a viscosimetric (Staudinger) average molecular weight equal to 10,000–11,700;
Vistanex ® MML80 (Esso Chem. Co.): polyisobutene with a viscosimetric (Staudinger) average molecular weight equal to 64,000–81,000;
Napvis ® DE10 (BP Chemicals): polybutene oil with an osmometric average molecular weight equal to 950; pour point −7° C. (ASTM D97-57);
Silica CAB-O-SIL H5 (Cabot): pyrogenic silica with a surface area of 325 m$^2$/g and an average particle diameter of 0.007 μm;
Kraton ® G 1702 (Shell Chemical Co.): styrene-ethylene/propylene diblock copolymer of average molecular weight 170,000;
Dutral ® CO 043 (Enichem Elastomers): ethylene/propylene elastomeric copolymer;
Irganox ® 1010 (Ciba-Geigy): antioxidant (pentaerythrityl-tetra [3-(3,5-di-tert-butyl-4-hydroxyphenyl)propionate]).

TABLE 2

| Material | Example 1 | | | Example 2 | | |
|---|---|---|---|---|---|---|
| Ageing time at 80° C. (days) | 0 | 7 | 14 | 0 | 7 | 14 |
| ΔWeight (%) | — | −0.54 | −0.56 | — | +1.48 | +1.77 |
| Stress at break (MPa) | 21.7 | 21.3 (−1.9%) | 20.6 (−5.1%) | 21.7 | 19.7 (−9.3%) | 20.5 (−5.6%) |
| Elongation at break (%) | 370 | 327 (−11.7%) | 320 (−13.6%) | 370 | 365 (−1.4%) | 335 (−9.5%) |
| Modulus (MPa) | 499 | 419 (−16%) | 403 (−19.3%) | 499 | 460 (−7.9%) | 449 (−10%) |

EXAMPLE 6

(a) Manufacturing of the Self-Protected Cable

A layer of polypropylene insulating material (commercial product Moplen® BT 20 from Montell) with a nominal thickness of 1 mm was deposited on a flexible aluminium conductor of cross-section equal to 70 mm$^2$. For this operation, a Bandera 80 mm extruder in configuration 25 D, with a screw of pour-off thread type and an extrusion head with electrical heating was used, using the following compression-type assembly of moulds: tip die with a diameter of 10.5 mm, ring die with a diameter of 12.0 mm. The following temperature profile was used during the extrusion (° C.):

| draw-hole | screw | zone 1 | zone 2 | zone 3 | zone 4 | zone 5 | zone 6 | collar | head |
|---|---|---|---|---|---|---|---|---|---|
| 20 | neutral | 180 | 190 | 195 | 200 | 210 | 235 | 240 | 250 |

The following process conditions were employed:
Line speed: 2.8 m/min
Pressure at the extruder end: 60 bar
Extruder spin speed: 1.74 rpm
Extruder absorption: 30 Amps
Nominal diameter of the cold cable: 12.1 mm.

The cable core was subsequently subjected to a further processing phase, during which the self-repairing material and the outer sheath were applied using a tandem-type technique.

An application head coupled to a component for melting and pumping the self-repairing material was placed upstream of the point of application of the outer sheath.

A Nordson BM 56 device with a pressure plate and a supply gear pump was used as component for melting the self-repairing material. This device was coupled to the application head by means of a supply tube heated by electrical resistance and having a length of about 3 m.

The application head consisted of a hollow cylindrical component having an inlet hole for the cable core with a diameter slightly larger than that of the core itself, and an outlet hole of diameter equal to 13 mm.

A layer of self-repairing material with a nominal thickness of 0.5 mm, prepared as described above and corresponding to the composition of Example 1 (see Table 1), was applied using this application head.

The pultrusion was carried out using the following temperature settings:
Pressure plate: 120° C.
Supply tube: 120° C.
Application head: 90° C.

The outer sheath was applied downstream of the pultrusion zone, by means of the same Bandera 80 mm-25 D extruder described above, using Moplen® BT 20 (Montell) polypropylene as material, with a nominal thickness of 1 mm. Using the same set-up and the same temperature profile as indicated above for the insulation layer, the following mould mounting (in compression) was used: tip die with a diameter of 13.5 mm, ring die with a diameter of 18.2 mm.

The process conditions were set as follows:
Line speed: 2 m/min
Pressure at the end of the extruder: 20 bar
Extruder spin speed: 1.75 rpm
Extruder absorption: 19 Amps
Nominal diameter of the cold cable: 15.1 mm.

About 200 m of cable with a self-repairing layer were produced by means of the process described above.

(b) Damage Tests.

The cable thus obtained was subjected to tests to effect various types of damage to the coating layers in a controlled and reproducible manner.

To perform cutting, a device consisting of a C-shaped frame supporting a guide inside which slides a cylindrical shaft was used. One end of the shaft is threaded so as to allow various types of cutting tools to be mounted. The following types of damage was effected using this device:

(1) Blunt-type damage (based on standard ICEA S-81-570-1996, §6.2.3): the cable was subjected to impact with a steel anvil with a cutting angle of 92° and a rounded edge with a curvature radius of 0.6 mm;

(2) Blade-type damage followed by bending: the cable was subjected to impact with a steel blade having a thickness of 0.2 mm, and then to bending so as to cause a complete opening of the cut, using a mandrel with a diameter of 375 mm, equivalent to 25 times the diameter of the cable;

(3) Shovel-type damage (according to standard DIN 20127): the cable was subjected to a static load by means of a tool with a cutting angle of 21.8° and a flat profile at the point of contact, 0.5 mm in width.

The impact energy or, in the case of static load (test (3)), the load required to completely cut through all of the coating layers until the conductor was reached without damaging it, was determined for each of the above-mentioned tests. This measurement was carried out with the aid of an oscilloscope coupled to the cable, through which a certain amount of current was passed. At the moment the cutting tool reached the conductor, the oscilloscope recorded the instantaneous change in the electrical signal caused by the short-circuit resulting from the contact between the tool and the conductor.

For the blunt-type damage (1), the impact energy required to reach the conductor was 9.2 J, obtained using a mass of 53.7 kg and a drop height (including the diameter of the cable) of 32.5 mm.

For the blade-type damage (2), the impact energy required to reach the conductor was 1 J, obtained using a mass of 26 kg and a drop height (including the diameter of the cable) of 19 mm.

For the shovel-type damage (3), the load required to reach the conductor was 100 kg.

To qualitatively evaluate the existence of a effect of radial compression on the layer of self-repairing material by the outer sheath, the cable was subjected to the following test. Holes were made in a small length of cable using a pillar drill with perforation bits of 3 and 5 mm in diameter. The holes were made on two directrices at 180° relative to each other. The depth of the holes was such as to cut completely through the thickness of the sheath until the self-repairing material was reached. The cable damaged in this way was left in a horizontal position so as to have one series of holes oriented upwards and the other series oriented downwards. After 24 hours, it was observed that the self-repairing material had completely filled all of the holes, leaking out in a negligible quantity. Since the test was carried out without applying any external force, except for the force of gravity, the leakage of material through the holes facing upwards is a clear indication of the existence of a radial pressure exerted by the outer sheath, which assists the movement of the material towards the points of rupture.

On the basis of a mathematical model of a cable in which it is taken account, for the various materials constituting the cable, of linear thermal dilation coefficient, volume dilation coefficient, longitudinal tension which maintains congruence between adjacent layers, elastic modulus and temperature change which the cable undergoes during the extrusion process, the Applicant has calculated, for the cable according to the present example, a radial compression value exerted by the outer sheath on the self-repairing layer equal to about 3.8 bar. Of course, this value should be considered only as an approximate evaluation of the ringing effect of the outer sheath on the self-repairing layer, bearing in mind that this effect is influenced not only by the characteristics of the materials used, but also by the specific conditions under which extrusion and subsequent cooling of the sheath are carried out.

(c) Electrical Tests.

To check effectiveness of self-repairing, leakage currents were measured on small cable lengths damaged according to the various ways described above under the following conditions.

Immediately after damage, the cable lengths were connected to an electrical circuit and immersed in a tank containing tap water at room temperature. Throughout the period of the test, which lasted 60 days in total, an a.c. voltage of 150 V at 50 Hz was applied to the cable lengths, causing a current to flow such as to bring the temperature of the conductor to about 50° C. in the part immersed in water, corresponding to about 100° C. in the part in air, with continuous cycles of 12 hours of heating and 12 hours of spontaneous cooling.

The total leakage current ($I_L$) was measured by means of a Keithley Mod. 197 type digital multimeter. The current $I_L$ measured is the result of the vectoral sum of the typical capacitive current of the undamaged cable $I_C=\omega \cdot C \cdot V$ (where $\omega$ is the pulsation, C is the capacitance and V is the applied voltage), and of the breakdown current ($I_B$) caused by any occurring damage. In a damaged but not self-protected cable, the breakdown current is largely prevailing over the capacitive current, therefore the measured leakage current is substantially equal to the breakdown current.

In Table 3 the results of measurements are reported, as average value on 5 samples of the same type. For comparative purposes there are reported the values of leakage currents measured on an intact, i.e. undamaged, cable having the self-repairing layer and on an identical cable without the self-repairing layer and which was subjected to a blade-type damage.

TABLE 3

| | $I_L$ ($\mu A/m$) | | | | |
|---|---|---|---|---|---|
| | Cable with self-repairing layer | | | | Cable without self-repairing layer |
| Test time (days) | as such | shovel cut | blade cut | blunt cut | blade cut |
| 0 | 12.8 | 13.0 | 12.5 | 13.1 | 20,000 |
| 3 | 12.9 | 13.4 | 12.9 | 12.7 | 20,000 |
| 9 | 12.6 | 12.7 | 13.1 | 13.1 | 8,000 |
| 30 | 13.8 | 14.5 | 14.6 | 14.7 | >100,000 |
| 60 | 14.0 | 13.9 | 14.5 | 14.2 | — |

As may be noted from the results given Table 3, the cable with a self-repairing layer according to the present invention and damaged according to the various methods described above shows very low leakage currents even after 60 days of immersion in water, which are substantially identical to those of the intact cable. Therefore, the breakdown current is essentially null, the leakage current measured being attributable almost exclusively to the intrinsic capacitive current of the cable.

In contrast, the cable without a self-repairing layer and with a blade-type damage immediately showed high leakage currents due to the damage, which, after 30 days of standing in water, led to total corrosion of the conductor, with complete interruption of the circuit. The slight decrease in the leakage current after 9 days is attributable to the formation of a layer of aluminium hydroxide as a result of the conductor corrosion, which allowed a certain degree of electrical insulation to be obtained. As corrosion progressed, large amounts of aluminium hydroxide formed which, increasing in volume upon contact with water, led to complete rupture and opening of the coating layers.

EXAMPLE 7

(a) Manufacturing of the Self-protected Cable.

Following basically the same method as that described for Example 6, a cable core consisting of a compressed aluminium conductor (cross-section: 54 mm²), insulated with a layer of silane-crosslinked linear low density polyethylene (LLDPE) (product DFDA 7530 from Union Carbide) having a nominal thickness of 1 mm was prepared.

Then, the layer of self-repairing material and the outer sheath were applied on the cable core using the tandem-type technique as described in Example 6. The self-repairing material (nominal thickness: 0.5 mm) had the composition of Example 5 given in Table 1, whereas the outer sheath consisted of silane-crosslinked high density polyethylene (HDPE) (product LS 6402-00 from Quantum) (nominal thickness: 1 mm).

The layer of self-repairing material was applied by means of the pultrusion process as described in Example 6, under the following temperature settings:

Pressure plate: 200° C.

Supply tube: 200° C.

Application head: 200° C.

The outer sheath was applied downstream of the pultrusion zone, according to the method described in Example 6. The process conditions were set as follows:

Line speed: 1.3 m/min

Extruder spin speed: 3.82 rpm

Extruder absorption: 61.5 Amps

Nominal diameter of the cold cable: 14.5 mm.

About 100 m of cable with a self-repairing layer were produced by the process described above.

Lengths of cable were subjected to the same damage tests as those described in Example 6. The effectiveness of self-repairing was assessed by measuring the leakage current following the same procedure as that described in Example 6. Table 4 gives the results obtained (as average value on 5 samples of the same type).

TABLE 4

| | $I_L$ ($\mu$A/m) | | | | |
|---|---|---|---|---|---|
| | Cable with self-repairing layer | | | | Cable without self-repairing layer |
| Test time (days) | as such | shovel cut | blade cut | blunt cut | blade cut |
| 30 | 18.7 | 19.5 | 20.2 | 19.5 | >100,000 |
| 60 | 19.5 | 19.8 | 20.8 | 20.1 | — |

Similarly to the results of Example 6, the cable with the self-repairing layer according to the present invention and damaged according to the various methods described above showed very low leakage currents even after 60 days of immersion in water, which are substantially identical to those of the intact cable. In contrast, the cable without the self-repairing layer and with blade-type damage showed high leakage currents due to the damage, which, after 30 days of standing in water, led to total corrosion of the conductor, with complete interruption of the circuit.

What is claimed is:

1. A cable, comprising from interior to exterior:
    a conductor;
    an inner layer of a self-repairing material, the material at a working temperature of the cable being dielectric, having sufficient cohesiveness to spontaneously re-unify after being ruptured by an external force, being capable of migrating with a controlled flowability towards a void in an adjacent layer, and having substantial physico-chemical inertness with respect to other materials in the cable; and
    an outer coating layer.

2. The cable of claim 1, further comprising an insulating coating layer around the conductor, wherein the inner layer is located between the insulating coating layer and the outer coating layer.

3. The cable of claim 1, further comprising an insulating coating layer, wherein the inner layer is located between the conductor and the insulating coating layer.

4. The cable of claim 1, wherein the outer coating layer is an outer sheath.

5. The cable of claim 1, wherein the outer coating layer is an insulating layer.

6. The cable of claim 1, further comprising an expanded polymer coating.

7. The cable of claim 6, wherein the expanded polymer coating is located in direct contact with an outer protective sheath.

8. The cable of claim 1, wherein the inner layer has a thickness of not less than 0.1 mm.

9. The cable of claim 8, wherein the inner layer has a thickness between about 0.2 mm and 2 mm.

10. The cable of claim 9, wherein the inner layer has a thickness between about 0.3 mm and 1 mm.

11. The cable of claim 1, wherein the self-repairing material has a dielectric strength under alternating current greater than 15 kV/mm and a resistivity greater than about $10^{14}$ $\Omega$·cm.

12. The cable of claim 11, wherein the self-repairing material has a dielectric strength under alternating current greater than about 20 kV/mm and a resistivity greater than about $10^{16}$ $\Omega$·cm.

13. The cable of claim 1, wherein the self-repairing material has a cohesive force at room temperature of at least 0.05 kg/cm$^2$.

14. The cable of claim 13, wherein the self-repairing material has a cohesive force at room temperature between about 0.1 kg/cm$^2$ and 4 kg/cm$^2$.

15. The cable of claim 14, wherein the self-repairing material has a cohesive force at room temperature between about 0.2 kg/cm$^2$ and 2 kg/cm$^2$.

16. The cable of claim 13, wherein the self-repairing material has a cohesiveness in which the force of recohesion measured at room temperature has a value of not less than 80% relative to the value of the cohesive force measured on the material.

17. The cable of claim 16, wherein the force of recohesion measured at room temperature has a value of not less than about 90% relative to the value of the cohesive force measured on the material.

18. The cable of claim 1, wherein the self-repairing material has a controlled flowability in which a sample of about 3 grams of self-repairing material, placed on an aluminum plate inclined at 60° relative to the horizontal plane and maintained at 60° C. for 24 hours, shows a displacement of the material front along the inclined plate between 0.5 mm and 400 mm.

19. The cable of claim 18, wherein the displacement of the front of the self-repairing material sample along the inclined plate is between about 1 mm and 200 mm.

20. The cable of claim 19, wherein the displacement of the front of the self-repairing material sample along the inclined plate is between about 50 mm and 100 mm.

21. The cable of claim 1, wherein the self-repairing material has a saturation water content of less than 400 ppm.

22. The cable of claim 21, wherein the self-repairing material has a saturation water content of less than about 200 ppm.

23. The cable of claim 1, wherein the self-repairing material has a permeability to water vapour, measured at room temperature according to ASTM E96, between 1.2× $10^{-7}$ g/(cm·hour·mmHg) and 8.0×$10^{-6}$ g/(cm·hour·mmHg).

24. The cable of claim 1, wherein the self-repairing material comprises an amorphous polymer having properties of a high-viscosity liquid or of a semi-solid.

25. The cable of claim 24, wherein the amorphous polymer comprises at least one of:

(a) polyisobutene or isobutene copolymers with minor amounts of different $C_4$–$C_{12}$ α-olefins;
(b) atactic propylene homopolymers; and
(c) silicone rubbers, consisting of linear chains of monomer units of formula —O—$SiR_1R_2$—, wherein $R_1$ and $R_2$ are optionally substituted aliphatic or aromatic radicals.

26. The cable of claim 25, wherein the amorphous polymer is polyisobutene having a viscosimetric (Staudinger) average molecular weight between 2,000 and 50,000.

27. The cable of claim 26, wherein the amorphous polymer is polyisobutene having a viscosimetric (Staudinger) average molecular weight between about 5,000 and 20,000.

28. The cable of claim 24, wherein the amorphous polymer is dissolved in a solvent.

29. The cable of claim 28, wherein the solvent is a mineral oil or a synthetic oil.

30. The cable of claim 29, wherein the solvent is a paraffinic oil or naphthenic oil.

31. The cable of claim 28, wherein the amorphous polymer is dissolved in a solvent which is a low molecular weight homologue of the amorphous polymer.

32. The cable of claim 31, wherein the amorphous polymer is a polyisobutene having a viscosimetric (Staudinger) average molecular weight between 2,000 and 50,000, dissolved in a polybutenic oil having an osmometric average molecular weight between 400 and 1,300.

33. The cable of claim 31, wherein the amorphous polymer is a silicone rubber, dissolved in a silicone oil having a viscosity between 100 $mm^2$/sec and 5,000 $mm^2$/sec at 25° C.

34. The cable of claim 28, wherein the amount of solvent is between 5% and 95% by weight, relative to the total weight of the mixture.

35. The cable of claim 34, wherein the amount of solvent is between about 50% and 90% by weight, relative to the total weight of the mixture.

36. The cable of claim 28, wherein the self-repairing material also comprises a thickener.

37. The cable of claim 36, wherein the thickener comprises at least one of: pyrogenic silica or bentonite.

38. The cable of claim 36, wherein the thickener is added in amounts between 1 to 20 parts by weight relative to the total weight of the mixture.

39. The cable of claim 24, wherein the self-repairing material also comprises an inorganic filler.

40. The cable of claim 39, wherein the inorganic filler comprises at least one of: kaolin, calcium carbonate, aluminum hydroxide, magnesium hydroxide, talc, and precipitated silica.

41. The cable of claim 39, wherein the inorganic filler is present in amounts between 5 and 50 parts by weight with respect to the total weight of the mixture.

42. The cable of claim 24, wherein the self-repairing material also comprises a tackifying agent.

43. The cable of claim 42, wherein the tackifying agent comprises at least one of: natural or synthetic rosins, or derivatives thereof, and esterified polyalcohols.

44. The cable of claim 42, wherein the tackifying agent is present in amounts between 1% and 20% by weight with respect to the total weight of the mixture.

45. The cable of claim 1, wherein the self-repairing material comprises a solid polymeric material dispersed in an oily phase.

46. The cable of claim 45, wherein the oily phase comprises at least one of:
(a) paraffinic or naphthenic oils;
(b) polybutene oils having an osmometric average molecular weight between 400 and 1,300;
(c) polypropylene oils; and
(d) low molecular weight polyesters.

47. The cable of claim 45, wherein the solid polymeric material is a high molecular weight polymer with elastomeric properties comprising at least one of:
(i) styrene block copolymers or terpolymers with different olefins and/or with dienes;
(ii) polyisobutene or copolymers of isobutene with minor amounts of different $C_4$–$C_{12}$ α-olefins;
(iii) propylene copolymers with ethylene and/or with $C_4$–$C_{12}$ α-olefins or with $C_4$–$C_{20}$ dienes;
(iv) polyisoprene or natural rubber;
(v) nitrile rubbers;
(vi) butyl rubbers; and
(vii) amorphous ethylene copolymers.

48. The cable of claim 45, wherein the solid polymer material is dispersed in the oily phase in a subdivided form, in an amount between 5% and 70% by weight relative to the total weight of the mixture.

49. The cable of claim 1, wherein the self-repairing material consists essentially of polyisobutene having an average molecular weight of about 64,000–81,000, an ethylene/propylene elastomeric copolymer, a polybutene oil, and an antioxidant.

50. The cable of claim 1, wherein the self-repairing material consists essentially of an ethylene/propylene elastomeric copolymer, paraffinic oil, and an antioxidant.

51. The cable of claim 1, wherein the self-repairing material consists essentially of polyisobutene having an average molecular weight of about 2,000–50,000 and an antioxidant.

52. A method for imparting to a cable comprising a cable core and at least one coating layer a capacity of self-repairing the at least one coating layer, comprising: providing directly on the cable core a dielectric material, the material at a working temperature of the cable having a controlled flowability, having sufficient cohesiveness to spontaneously re-unify after being ruptured by an external force, having a capacity, upon creation of a discontinuity in the at least one coating layer, of migrating to the discontinuity and reestablishing a continuity in the at least one coating layer in a reversible manner, and having substantial physico-chemical inertness with respect to other materials in the cable.

53. The method of claim 52, wherein the material is capable of at least partially filling the discontinuity without leaking from the cable in an uncontrolled manner.

54. The method of claim 52, wherein the at least one coating layer is an outer sheath.

55. The method of claim 52, wherein the at least one coating layer is an insulating layer.

56. The method of claim 52, wherein the material consists essentially of polyisobutene having an average molecular weight of about 2,000–50,000 and an antioxidant.

57. The method of claim 52, wherein the material consists essentially of an ethylene/propylene elastomeric copolymer, paraffinic oil, and an antioxidant.

58. The method of claim 52, wherein the material consists essentially of polyisobutene having an average molecular weight of about 64,000–81,000, an ethylene/propylene elastomeric copolymer, a polybutene oil, and an antioxidant.

59. A process for manufacturing a cable having a layer of self-repairing material, comprising the steps of:
extruding a cable core including a flexible conductor;
depositing a dielectric self-repairing material, maintained in a fluid state, directly on the cable core, the material at a working temperature of the cable being dielectric, having sufficient cohesiveness to spontaneously re-unify after being ruptured by an external force, being capable of migrating with a controlled flowability towards a void in an adjacent layer, and having substantial physico-chemical inertness with respect to other materials in the cable; and forming the layer of self-repairing material so as to obtain a uniform layer of a predetermined thickness.

60. The process of claim 59, further comprising the steps of:

introducing an initial section of the cable core inside an application head through an inlet hole with a diameter which is slightly larger than the diameter of the cable core, and an outlet hole having a diameter which is predetermined according to the desired thickness of the layer of self-repairing material;

feeding the application head with the self-repairing material maintained in a fluid state by pre-heating; and passing the cable core through the application head so as to perform the deposition of the self-repairing material and the simultaneous forming of the layer of self-repairing material.

61. A cable, comprising:

a conductor;

a first insulating layer;

a self-repairing layer in contact with the first insulating layer, the self-repairing layer being a dielectric material, having sufficient cohesiveness to spontaneously re-unify after being ruptured by an external force, and being capable of migrating with a controlled flowability towards a void in an adjacent layer at a working temperature of the cable; and an outer layer located substantially around the self-repairing layer.

62. The cable of claim 61, further comprising:

a second insulating layer in contact with the self-repairing layer.

63. A cable, comprising:

a conductor;

a dielectric self-repairing layer in contact with the conductor;

a first insulating layer in contact with the self-repairing layer, the self-repairing layer having a controlled flowability at a working temperature of the cable, having sufficient cohesiveness to spontaneously re-unify after being ruptured by an external force, and having a capacity, upon creation of a discontinuity in the first insulating layer, of migrating to the discontinuity and reestablishing a continuity in the first insulating layer in a reversible manner; and an outer layer located around the first insulating layer.

64. The cable of claim 63, further comprising:

a second insulating layer in contact with the first insulating layer.

65. A method for imparting to a cable comprising a conductor and at least one coating layer a capacity of self-repairing the at least one coating layer, comprising:

providing the cable with an inner layer comprising a dielectric material substantially surrounding and in contact with the at least one coating layer, the dielectric material at a working temperature of the cable having a controlled flowability, having sufficient cohesiveness to spontaneously re-unify after being ruptured by an external force, having a capacity, upon creation of a discontinuity in the at least one coating layer, of migrating to the discontinuity and reestablishing a continuity in the at least one coating layer in a reversible manner, and having substantial physico-chemical inertness with respect to other materials in the cable.

66. The method of claim 65, further comprising a second coating layer, wherein the second coating layer is an outer sheath.

67. The method of claim 65, wherein the at least one coating layer is an insulating layer.

68. A cable, comprising:

a cable core including at least a conductor;

an inner layer of a dielectric self-repairing material, the material at a working temperature of the cable having sufficient cohesiveness to spontaneously re-unify after being ruptured by an external force, being capable of migrating with a controlled flowability towards a void in an adjacent layer, and being positioned in contact with the cable core; and an outer layer.

* * * * *